United States Patent
Golden et al.

(10) Patent No.: US 9,261,599 B1
(45) Date of Patent: Feb. 16, 2016

(54) SYSTEM AND METHOD FOR IMPROVING GPS ACCURACY IN A DEVICE BY UTILIZING INCREASED TIME STAMP ACCURACY

(71) Applicant: WolfGIS, LLC, Pell City, AL (US)

(72) Inventors: John Michael Golden, Pell City, AL (US); U. Angus Macgreigor, Park City, UT (US)

(73) Assignee: WOLF-TEK, LLC, Pell City, AL (US)

( * ) Notice: Subject to any disclaimer, the term of this patent is extended or adjusted under 35 U.S.C. 154(b) by 390 days.

(21) Appl. No.: 13/728,919

(22) Filed: Dec. 27, 2012

Related U.S. Application Data (60) Provisional application No. 61/701,801, filed on Sep. 17, 2012.

(51) Int. Cl.
*G01S 19/25* (2010.01)
*G01S 19/03* (2010.01)

(52) U.S. Cl.
CPC .................................. *G01S 19/256* (2013.01)

(58) Field of Classification Search
CPC ........ G01S 19/05; G01S 19/42; G01S 19/258
USPC ............... 342/357.21, 357.25, 357.4, 357.64; 701/468, 469
See application file for complete search history.

(56) References Cited

U.S. PATENT DOCUMENTS

| 5,375,059 | A |   | 12/1994 | Kyrtsos et al. |
|---|---|---|---|---|
| 5,438,517 | A |   | 8/1995 | Sennott et al. |
| 5,490,073 | A |   | 2/1996 | Kyrtsos |
| 5,786,773 | A | * | 7/1998 | Murphy .................. G01S 19/07 340/947 |
| 7,714,779 | B2 | * | 5/2010 | Abraham ................ G01S 19/05 342/357.31 |
| 8,378,815 | B1 |   | 2/2013 | Jones et al. |
| 8,467,806 | B2 | * | 6/2013 | Edge ........................ H04W 4/02 455/456.1 |
| 2006/0135180 | A1 |   | 6/2006 | Jakel et al. |
| 2013/0174076 | A1 |   | 7/2013 | Geelen |
| 2015/0084812 | A1 | * | 3/2015 | Sernik ................... G01S 19/215 342/357.43 |

FOREIGN PATENT DOCUMENTS

EP 1431848 A2 6/2004

* cited by examiner

*Primary Examiner* — Dao Phan
(74) *Attorney, Agent, or Firm* — Butler Snow LLP (57) ABSTRACT

A system and method is disclosed for updating the universal time within a GPS enable device in real-time and utilizing that corrected time to improve upon pseudorange calculations in the GPS devices. A time shim is introduced to correct outlier time values and provide improved pseudorange calculations to the device operating system, as well as draw upon various predictive smoothing methods of timestamp and position data to improve GPS location values. The improved GPS data is then provided to a location services process running on the device in an expected format and timing such that the operating system is unaware that the prior application interface of the system has been circumvented.

21 Claims, 8 Drawing Sheets

SYSTEM AND METHOD FOR IMPROVING GPS ACCURACY IN A DEVICE BY UTILIZING INCREASED TIME STAMP ACCURACY

This application claims the benefit of filing priority under 35 U.S.C. §119 and 37 C.F.R. §1.78 of the U.S. Provisional Application Ser. No. 61/701,801 filed Sep. 17, 2012, for a Geo-Positioning System and Method Incorporating Time Shim. All information disclosed in that prior pending provisional application is incorporated herein by reference.

FIELD OF THE INVENTION

The present invention relates generally to global positioning systems ("GPS"). In greater particularity, the present invention relates to systems and methods for improving the accuracy of GPS location calculations. In even greater particularity, the present invention relates to improving the accuracy of GPS location calculations in devices by improving the accuracy of GPS satellite time.

BACKGROUND OF THE INVENTION

The Global Positioning System ("GPS") is a U.S.-owned utility that provides users with positioning, navigation, and timing services. This system consists of three segments: the space segment, the control segment, and the user segment. The U.S. Air Force develops, maintains, and operates the space and control segments.

As with the Internet, GPS has emerged as an essential element of the global information infrastructure. Thousands of applications affecting every aspect of modern life utilize GPS technology, from cell phones and PDA's, to bulldozers, shipping containers, and ATM's. In particular, hand-held PDA based tools have emerged as economical location and navigation tools available to everyday consumers, making accurate geo-positioning common place. And, GPS remains critical to U.S. national security with GPS devices integrated into virtually every facet of U.S. military operations. Nearly all new military assets—from vehicles to munitions—come equipped with GPS capability. Hence, GPS remains critical to U.S. national security.

GPS consists of three primary segments: a space segment, a control segment, and a user segment. The U.S. Air Force develops, maintains, and operates the space and control segments. The user segment is essentially the users of the GPS system. GPS satellites broadcast signals from space, and each GPS receiver (e.g. a cell phone or PDA) uses these signals to calculate its three-dimensional location (latitude, longitude, and altitude) and the current time. The space segment is composed of 24 to 32 satellites in medium Earth orbit and also includes the payload adapters to the boosters required to launch them into orbit. The control segment includes a master control station, an alternate master control station, and a host of dedicated and shared ground antennas and monitor stations.

The user segment is composed of hundreds of thousands of U.S. and allied military users of the secure GPS Precise Positioning Service ("PPS") and tens of millions of civil, commercial, and scientific users of the Standard Positioning Service. The Standard Positioning Service is less precise than the military PPS, but the PPS has limited accessibility.

A critical hardware component in utilizing GPS is a GPS receiver. The receiver calculates its position on the Earth by precisely timing signals sent by GPS satellites positioned in their orbits above and around the Earth. Each satellite continually transmits messages that include (1) the time the message was transmitted; and (2) satellite position at time of message transmission. The receiver hardware uses the messages it receives to determine the transit time of each message and computes the distance to each satellite using the speed of light. Each of these distances and satellite locations define a sphere. The receiver is on the surface of each of these spheres when the distances and the satellite locations are correct. These distances and satellite locations are used to compute the location of the receiver using well known navigation equations. This location information is then provided to a location services application which, in turn, provides this information to any other applications running on the device that is (typically) physically combined with the receiver that have a need for the location information. For example, the location information might be utilized by a simple display application to display the location in terms of latitude and longitude coordinates on the device's display, or an application might display a location icon on a moving map display, or an application might provide elevation information to a user of the device. Many GPS devices, such as cell phones and PDAs, use the location information to calculate and show more refined information such as compass heading and speed of the device which can be calculated from position changes over time of the device. Banking ATMs also rely on GPS information for providing accurate time-stamps of financial transactions, such as the dispensing of cash. So, as can be understood, a myriad of applications running a plethora of devices would be requesting and obtaining location information from the receiver at any moment during the operation of the device.

GPS receivers operate on a "line-of-sight" methodology, and at least four or more satellites must be visible to the device to obtain accurate location results. Four sphere surfaces typically do not intersect, but provide enough information to solve the navigation equations with fairly high level of confidence to calculate the position of the receiver and the current time. Most applications only use the location information, and bypass the time information.

For a complete understanding of the hereto-be-described invention, some additional knowledge of how GPS works is necessary. The navigational signals transmitted by GPS satellites are transmitted on two separate carrier frequencies that are common to all satellites in the network. Two different encodings are used: (1) a public encoding that enables lower resolution navigation, and (2) an encrypted encoding used by the U.S. military (i.e. the PPS mentioned above). GPS satellites generate "messages" having a number of "subframes", containing the following information: (1) a clock timestamp, (2) an "ephemeris" (the precise satellite orbit from the transmitting satellite), and (3) an "almanac" (satellite network synopsis and error correction information). Each GPS satellite continuously broadcasts a navigation message on a channel referred to as L1—C/A, L2—P/Y, each transmitted at a rate of 50 bits per second. Each complete message is transmitted in 1500 bits and takes 750 seconds to transmit a complete message. Each message is tied to specific timing of the satellite clock as well as transmitting the exact time as part of the message. In order to obtain an accurate satellite location from the transmitted message, the receiver must demodulate the message for at least 18 to 30 seconds. In order to collect all the transmitted almanacs the receiver must demodulate the message for 732 to 750 seconds or 12 1/2 minutes.

All satellites broadcast at the same frequencies and are encoded using code division multiple access or "CDMA," which allows for messages from individual satellites to be distinguished from each other based on unique encodings for each satellite. Five frequencies are used in GPS, but for most consumers of GPS only the first, L1, is used. The frequency of L1 is 1575.42 MHz and L2 is 1227.60 MHz. Another signal L3 is broadcast at 1381.05 MHz and is used for nuclear detonation detection; a further signal L4 is broadcast at 1379.913 MHz and is used to assist with ionospheric correction; and the last L5 broadcasts at 1176.45 MHz and is used for civilian safety-of-life signal. The satellite network uses a CDMA spread-spectrum technique where the low-bitrate message data is encoded with a high-rate pseudo-random ("PRN") sequence that is different for each satellite. Every GPS receiver is built with knowledge of the PRN codes for each satellite in order to complete its location calculations.

As mentioned above, a GPS receiver uses messages received from satellites to determine the satellite positions and time sent. The x, y, and z components of satellite position and the time sent are designated as [xi, yi, zi, ti] where the subscript i denotes the satellite and has the value 1, 2, . . . , n, where n≥4. When the time of message reception indicated by the on-board clock is $t_r$, the true reception time is $t_r+b$ where b is receiver's clock bias (i.e., clock delay). The message's transit time is $t_r+b-t_i$. Assuming the message traveled at the speed of light, c, the distance traveled is $(t_r+b-t_i)c$. Knowing the distance from receiver to satellite and the satellite's position implies that the receiver is on the surface of a sphere centered at the satellite's position. Thus the receiver is at or near the intersection of the surfaces of the spheres. In the ideal case of no errors, the receiver is at the intersection of the surfaces of the spheres. The clock error or bias, b, is the amount that the receiver's clock is off. The receiver has four unknowns, the three components of GPS receiver position and the clock bias [x, y, z, b]. As are known, the equations of the sphere surfaces are given by:

$$(x-x_i)^2+(y-y_i)^2+(z-z_i)^2=([t_r+b-t_i]c)^2, i=1,2,\ldots,n$$

or in terms of "pseudoranges," $p_i=(t_r-t_i)c$, as $$p_i=\sqrt{(x-x_i)^2+(y-y_i)^2+(z-z_i)^2}-bc, i=1,2,\ldots,n.$$

These equations can be solved by algebraic or numerical methods, such as Bancroft's method, trilateration, or Multidimensional Newton-Raphson calculations.

UTC or "Universal Time Coordinated," referred to in English speaking countries as Coordinated Universal Time, is the accepted standard by which most of the world regulates timestamps, clocks, and network computing. For example, Network Time Protocol ("NTP") was designed to synchronize the clocks of computers over the Internet and encodes times using the UTC system. The UTC standard was officially adopted in 1961 by the International Radio Consultative Committee with the efforts of several national time laboratories. UTC is based on International Atomic Time (TAI), a time standard calculated using a weighted average of signals from atomic clocks located in national laboratories around the world. UTC differs from TAI only in that leap seconds are added to the time to match Earth's orbital rotation. Almost all time zones around the world are expressed as positive or negative offsets from UTC, and GPS satellites set their precise internal clocks derived from UTC.

The National Institute of Standards and Technology ("NIST") develops technologies, measurement methods and standards that help U.S. companies compete in the global marketplace. Congress created NIST in 1901 at the start of the industrial revolution to provide the measurement and standards needed to resolve and prevent disputes over trade and to encourage standardization. NIST also maintains the official US time as UTC(NIST), which is the coordinated universal time scale maintained at NIST. The UTC-(NIST) time scale comprises an ensemble of cesium beam and hydrogen maser atomic clocks, which are regularly calibrated by the NIST primary frequency standard. The number of clocks in the time scale varies, but is typically around ten. The outputs of the clocks are combined into a single signal by using a weighted average. The most stable clocks are assigned the most weight. The clocks in the UTC-(NIST) time scale also contribute to the TAI and UTC as part of the world average, upon which GPS satellites rely. UTC-(NIST) serves as a national standard for frequency, time interval, and time-of-day. It is distributed through the NIST time and frequency services and continuously compared to the time and frequency standards located around the world.

While most clocks are synchronized directly to UTC, the atomic clocks on the satellites are set to GPS time. The difference is that GPS time is not corrected to match the rotation of the Earth, so it does not contain leap seconds or other corrections that are periodically added to UTC. GPS time was set to match UTC in 1980, but has since diverged. The lack of corrections means that GPS time remains at a constant offset with TAI (e.g. TAI–GPS=19 seconds), and the GPS navigation message includes the difference between GPS time and UTC.

Periodic corrections are performed on the satellite on-board clocks to keep them synchronized with ground clocks. As of July 2012, GPS time is 16 seconds ahead of UTC because of the leap second added to UTC Jun. 30, 2012. GPS receivers subtract this offset from GPS time to calculate UTC and specific time zone values. The GPS-UTC offset field can accommodate 255 leap seconds (eight bits) that, given the current period of the Earth's rotation (with one leap second introduced approximately every 18 months), should be sufficient to last until approximately the year 2300.

Since the advent of GPS, relatively precise time stamps are available from commercial GPS receivers. Since GPS receiver functions by precisely measuring the transit time of signals received from several satellites, precise timing is fundamental to an accurate GPS location. As indicated above, the time from an atomic clock on board each satellite is encoded into the radio signal, and the receiver determines the time transit for each received the signal. To do this, a local clock in a GPS device is corrected to the GPS atomic clock time by solving for three dimensions and time based on four or more satellite signals and updating its own clock time. Improvements in GPS processing algorithms lead many modern low cost GPS receivers to achieve better than 10 meter accuracy, which implies a timing accuracy of about 30 ns, and GPS-based laboratory time references routinely achieve 10 ns precision. Hence, GPS enabled devices have access to precise time and can, therefore, generate their own accurate timestamps for processing transactions.

As accurate as GPS can be, many factors exist to degrade the accuracy of GPS calculations. For example, atmospheric variances (temperature and pressure variances at differing altitudes and locations) can cause inaccuracies in the signal reception time, and objects may interrupt message transmissions since GPS reception is line-of-sight dependent. So, GPS receivers use a plethora of techniques, to improve on the accuracy of its location calculations. One technique is receiver autonomous integrity monitoring or "RAIM." RAIM detects faults within GPS pseudorange measurements, specifically, when more satellites are available than needed to produce a position fix, some pseudoranges that differ significantly from a statistically expected value, referred to by the statistical label of an "outlier," are excluded from the position calculations in the receiver to improve location precision. In some instances these outlier situations are caused by satellite signal integrity problems, like ionospheric dispersion, or signal interference, or errors in orbital path expectations. Traditional RAIM uses fault detection to provide a notice of a fault to the user, or provide exclusion situations to the receiver to enable the receiver to continue to operate in the presence of a GPS failure. The exclusion test is a statistic function of the pseudorange measurement residual (i.e. the difference between the expected measurement and the observed measurement). The statistic is compared with an error threshold value to determine if an actual fault has occurred and then position calculations are adjusted based upon curtained time limited exclusion rules. Hence, when RAIM is integrated into a GPS receiver, GPS satellite availability is based upon performance factors in calculating a position of the receiver.

Another technique is "differential correction." Differential correction techniques are used to enhance the quality of location data gathered to determine the receiver's position. The differential correction can be applied in real-time directly in the receiver's location processing or, after the fact, with post processing in a laboratory of office environment. The underlying idea of differential GPS is that any two receivers that are relatively close together will experience similar atmospheric errors. If a second GPS receiver is set up on a precisely known location that GPS receiver can act as a base or reference station to the first GPS receiver (aka the "roving" receiver). The base station receives the same GPS signals as the roving receiver but instead of working like a normal GPS receiver it uses its known position to calculate timing with the equations backwards. The base station calculates the travel time of the GPS signals to what they should be, and compares it with what they actually are. The difference is an "error correction" factor, and the receiver transmits this error information to the roving receiver so it can use it to correct its measurements, which allows the roving receiver to correct its own calculations in real-time. By this process, virtually any GPS receiver with a known precise location can be utilized as a base station, as long as a high-speed broadband Internet connection is available between the receivers so that the error correction information can be transmitted. For example, a cell tower, a Wi-Fi access point, or a radio beacon call all be used as base station for a GPS enabled device.

Satellite orbital geometry can also affect the accuracy of GPS positioning and can magnify or lessen other GPS errors. This effect is called Geometric Dilution of Precision (GDOP). GDOP refers to where the satellites are in relation to one another, and is a measure of the quality of the satellite position. The wider the angle between satellites, the better the measurement. Many GPS receivers have the ability to selectively utilize signals from satellites that provide the best certainty of information based upon this idea.

GPS receivers usually report the quality of satellite geometry in terms of Position Dilution of Precision, or PDOP. PDOP refers to horizontal (HDOP) and vertical (VDOP) measurements (latitude, longitude and altitude). A low DOP indicates a higher probability of accuracy, and a high DOP indicates a lower probability of accuracy. A PDOP of 4 or less is excellent, a PDOP between 5 AND 8 is acceptable, and a PDOP of 9 or greater is poor. Another term you may encounter is TDOP, or Time Dilution of Precision. TDOP refers to satellite clock offset. On some GPS receivers you can set a parameter known as the PDOP mask. This will cause the receiver to ignore satellite configurations that have a PDOP higher than the limit you specify and, in theory, improve position accuracy.

Another method used to improve location accuracy is carrier phase tracking. A GPS receiver determines the travel time of a signal from a satellite by comparing the "pseudo random code" it generates, with an identical code in the signal from the satellite. The receiver translates this code pattern back in time until the pattern becomes synchronized with the transmitted satellite code. The amount of translation time required to synchronize the two codes equals the signal's travel time, which is done for each satellite continuously. However, bits (or cycles) of the pseudo random code are relatively wide apart so that even when the codes are synchronized several meters of inaccuracy can remain in calculating a position.

A solution to this inaccuracy is called carrier phase tracking. The period of the GPS carrier frequency multiplied by the speed of light gives the wavelength, which is about 0.19 meters for the L1 carrier. Carrier phase tracking enabled receivers enhance the accuracy of time calculations between the receiver and the satellite by using pseudo random code synchronization to a point and then make further refined measurements based on phase variances using the carrier frequency for that code. The L1 carrier frequency is much higher than the random code frequency so its pulses are much closer together and therefore more accurate. Accuracy within 1% of wavelength in detecting the leading edge of the carrier will reduce the pseudorange code error to as little as 2 millimeters.

However, even given all of the augmentation technology and sophistication of GPS, many conventional geo-positioning systems still suffer from inaccuracy because, their onboard chipset clocks are not accurate enough to be able provide precise geo-positioning calculations. Even when these chipsets are corrected using calculations from signals received from the GPS satellites, their accuracy inhibits the level of precision required by many emerging software applications. Further, the same situation can occur with base stations as discussed above and limit the value of differential error data. Moreover, without sufficient timestamp precision, variations in GPS satellite time data cannot be verified and inaccurate satellite GPS data cannot be excluded as per a RAIM technique.

Hence, what is needed is a process for updating a universal timestamp in a GPS enabled device in real-time and utilize that time stamp to enhance the precision of GPS calculations in the GPS enable device while utilizing commercially standard clock hardware.

SUMMARY OF THE INVENTION

In summary, the invention is a system and method for updating the universal time within a GPS enable device in real-time and utilizing that corrected time to improve upon pseudorange calculations in the GPS devices. A time shim is introduced into the GPS device system to correct outlier time values and provide improved pseudorange calculations to the device operating system. Predictive smoothing of timestamp data and location data is applied to improve GPS location values provided to a location services process running on the device.

BRIEF DESCRIPTION OF THE DRAWINGS

A system and method incorporating the features of the invention is depicted in the attached drawings which form a portion of the disclosure and wherein.

DESCRIPTION OF THE PREFERRED EMBODIMENTS

Figure 1:
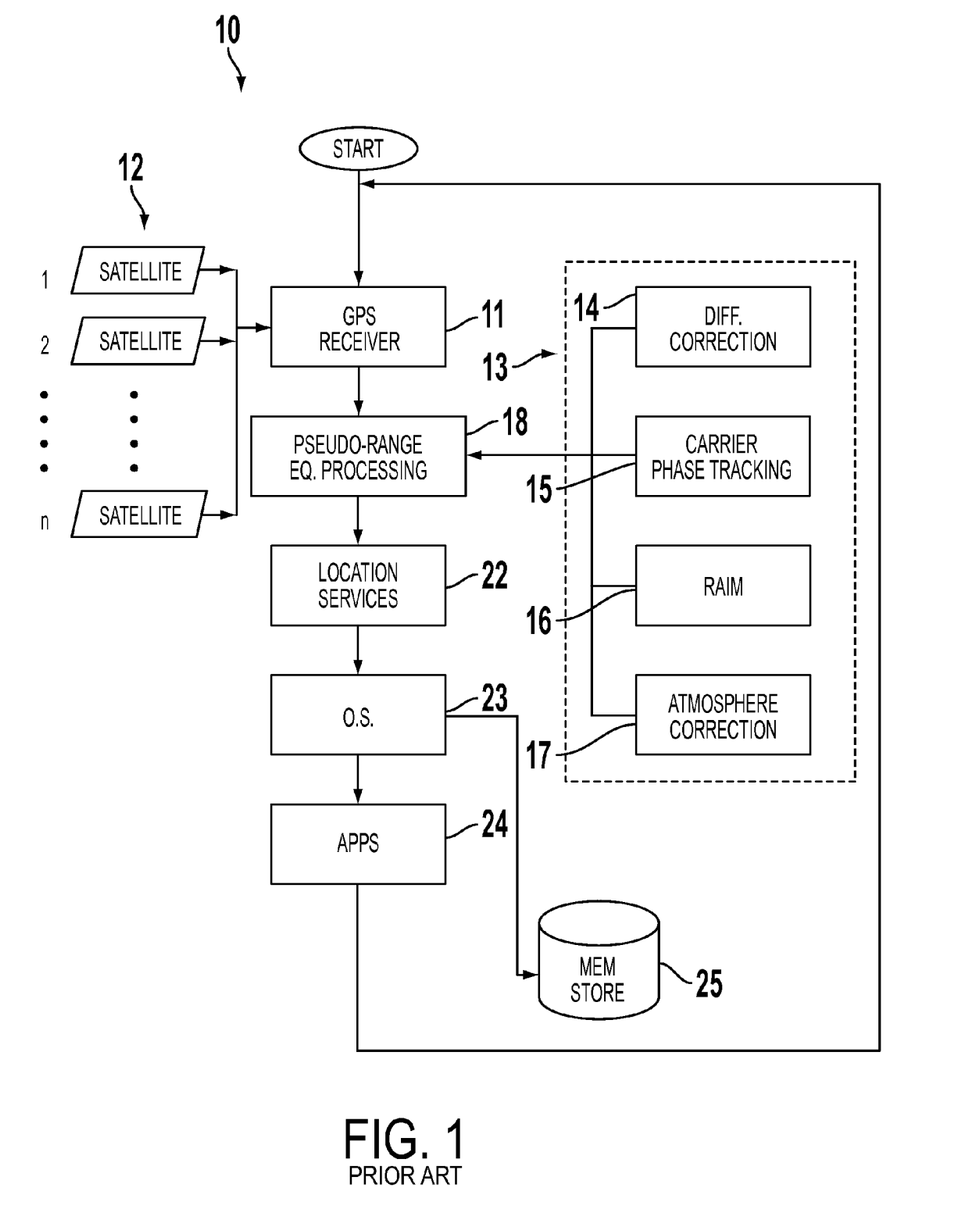
FIG. 1 is a functional block diagram of the prior art.

Referring to the drawings for a better understanding of the function and structure of the invention, FIG. 1 shows the current prior art 10 for most GPS enabled devices. A plurality of GPS satellites 12 provide GPS message information to a GPS receiver 11 storing that received GPS information in high-speed memory. The GPS receiver 11 may include its own processing module and firmware to calculate pseudo-ranges 18 based upon the received satellite messages, or an external processor as part of the device 10 itself may execute instructions held by the device to calculate pseudoranges. Pseudo-range accuracy may be improved through various pseudo-range equation enhancement sub-processes 13, such as differential correction 14, carrier phase tracking 15, RAIM 16, and techniques for atmospheric correction 17.

Once a sufficient number of pseudo-ranges have been calculated and are available to the system 10, that data is transferred in a recurring numeric stream to location services sub-system 22. The equation processing module 18 and the location services module 22 may be implemented in hardware, such as in a programming array logic device, or firmware such as an EPROM which can then be loaded into high-speed memory for execution, or those modules may be a stored application that can be loaded into high-speed memory for execution like other software applications. Each approach has its own advantages, such as speed or update flexibility, as is known in the art. Location services holds location information from the pseudo-ranges previously calculated and either can provide backend processing using pseudo-range data to calculate GPS coordinates, or manage a previously calculated GPS coordinate stream. However, the primary function of location services is to shunt location information to the operating system 23 of device 10 making GPS coordinate information available to applications 24 requesting GPS information from the operating system. The operating system holds a continually updated stream of GPS data in memory 25 and allocates that information to applications upon demand. The calculation of pseudo-ranges whether enhanced or not and the directing of that information to the OS, and consumption of that location information by various applications, is a continual interactive process, as shown, but due to power consumption limitations the entire GPS processing system does not typically engage until an application makes a request to the OS for location information.

Figure 2:
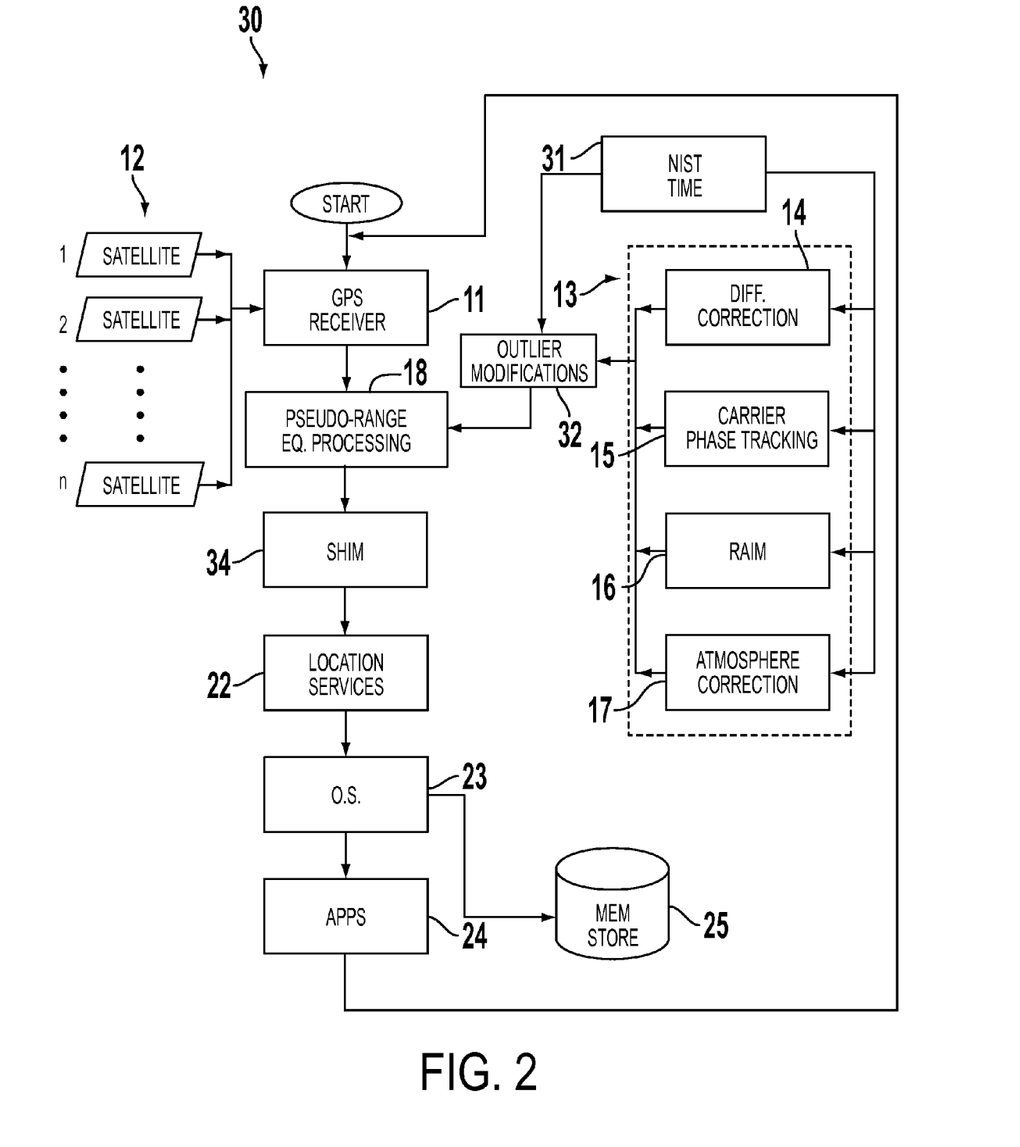
FIG. 2 is a functional block diagram of the overall invention as it fits in a typical GPS enable device.

As shown in 2, process 10 is improved upon into a new process 30 by utilizing time correcting techniques and incorporating a processing "shim" that "spoofs" the OS to utilize the invention's processing techniques to improve upon the resultant GPS data consumed by location services 22. For the purposes of this disclosure, a "shim" is defined as a set of instructions that subverts a known computer process and alters or redirects that process to a new intention. For example, shims are often used to accommodate changes in a system that cause the system to no longer work with a prior operative, thereby avoiding instabilities or incompatibilities in a system, or avoiding incompatibility of previously operational computer code. For example, shims are commonly used to maintain the compatibility of older applications made inoperative in an upgraded or next generation OS. Shims can also be used for running programs on different software platforms than for which they were originally developed.

However, in the present system 30, shim 34 operates by intercepting all hardware commands associated with location services requests and returns. The most efficient operative implementation for the shim 34 is to process such interception within a hardware implementation of the shim, such as for example as programmable array logic. However, the shim may be loaded from firmware into high-speed ram and executed after system boot-up. The shim then loads its own mapped library of commands onto the intercepted command structure of the device OS and utilizes outlier modifications 32 obtained from sub-process 13. Those outlier modifications are then processed by the devices pseudo-range process 18 and the shim interprets those results prior to sending them to location services 22. If the shim detects that an outlier modification is outside of a preselected numerical boundary, as will be discuss, the shim prevents associated pseudo-range values to be sent to location services.

"Spoofing" in the sense of the disclosed invention is a processing technique in which the location services sub-process 22, and thereby the OS 23, is fooled into thinking that the nominal processing output of pseudo-range equation processing module 18 is being received by location services 22 in an unaltered manner, and the OS processes such altered information received by location services 22 without being aware of the changes that have been made through shim 34. Hence, negligible effect on performance is encountered by system 30 as compared to nominal processing of system 10, and software application compatibility is also maintained.

In the preferred embodiment, satellite GPS messages 12 are received by GPS receiver 11 that GPS data transferred to a pseudo-range sub-processing module 18. Pseudo-range equation sub-processing module 18 processes pseudo-ranges in the same manner as the prior art system 10, except that the information it uses to make the pseudo-range calculations has been improved to enhance the precision of the calculated pseudo-ranges, as will be further discussed. A NIST certified time source or similar time source 31 continually receives precise time input (precision to $10^{-9}$) and the system 30 utilizes that time input to improve GPS accuracy. Specifically, enhancement sub-processes 13 utilize the NIST certified time data and uses the data to improve the correction processes 14-17 to yield better GPS results. Further, an outlier exclusion process 32 utilizes time data 31 to modify inputs into pseudo-range processing module 18, thereby enhancing processing results. A shim 34 excludes any conflicting system calls and shunts the pseudo-range information directly to the location services sub-module 22.

Figure 3:
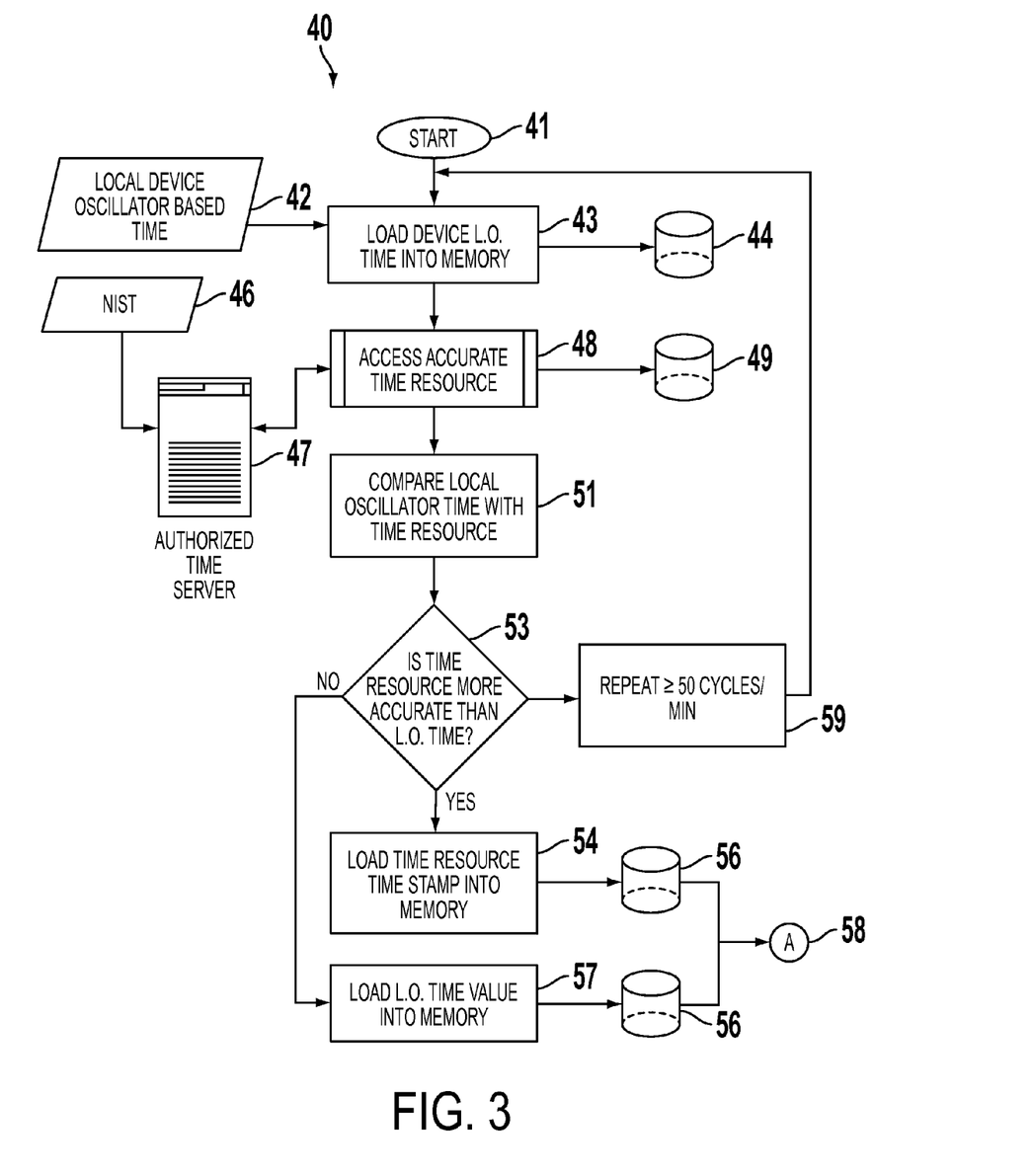
FIG. 3 is a functional block diagram of correction of local oscillator based time.

Referring now to FIG. 3, initially process 40 resolves which time source is more valuable to system 30 to be utilized in calculating and enhancing pseudo-ranges. All GPS devices include their own local oscillator based time source 42 which is continually loaded 43 into a specific memory location 44 in the system. In parallel, a NIST certified time source 46 is accessed 48 directly or through an authorized time server 47 and stored in memory 49. NIST time 46 may be accessed in various ways, such as for example, through cellular data network with "get" or "put" DNS commands, via unused dark fiber optical networks, Internet time-stamps as described in RFC 3339, Network Time Protocol ("NTP") as described in RFCs 5905-5908 (these obsolete the older RFC 958), or potentially time stamps provided by the iridium satellite constellation. For remote work areas, sometimes a network operation center can also provide NIST certified time.

In the preferred embodiment of the herein described invention, a NIST time server 47 is accessed via an IPT (Internet Protocol Tunnel) with a DIX frame (e.g. an Ethernet II frame) protocol to reduce latency, and a highly accurate time stamp value is obtained via "NTP" (Network Time Protocol) issued by the time server 47. The NIST time server overlays a Spanning Tree Protocol ("STP") to reduce time transmission frame redundancy and eliminate unnecessary looping to the devices requesting a time stamp.

Network Time Protocol (NTP) is a time synchronization system for computer clocks through the Internet. NIST time source 47 is synchronized with a primary NIST time source 46, either via wired or wireless signal and provides a consumable and highly accurate time-stamp to devices registered to operate pursuant to system 30, upon request. NTP is designed to produce three products: a clock offset a roundtrip delay and a dispersion value, all of which are relative to a selected reference clock. The clock offset represents the amount to adjust the local device clock to bring it into conformance with the reference NIST source clock, and a roundtrip delay value provides the capability to launch a message to arrive at to reference clock at a specified time. The dispersion value represents the maximum error of the local clock relative to the reference clock (i.e. the official NIST master server 46). Time source 47 issues a time-stamp to synchronize its master clock to the logical system clock of any registered device 42 using the service. Since precision measurements of offset and delay and definitive maximum error bounds are provided, a receiving registered device can determine not only the time, but the quality of the time as well. Each received time value is assigned a token of "0" or "1", with 1 being an acceptable or "certified" value and 0 being an unacceptable or "uncertified" value. If the shim 34 perceives that the time quality is below a specified value, a received time stamp value is assigned a token of 0 and excluded from current pseudorange calculations, as well as calculations in sub-process 13, until a time stamp having a token of 1 (i.e. a "certified" time value) is received and saved in memory 49.

Once both time values are saved (44-49), a comparison between the local device time and the NIST certified time is made 51 and a determination as to which time resource is more precise made 53. Given total and reliable access to a NIST certified time source, a NIST time value will generally be more accurate than a local oscillator time value and be selected. However, a plurality of circumstances arises in which a local time value may be more precise. For example, if a NIST time value is received but that arrival time of that value is outside of an acceptable receipt range, the NIST time value may be rejected. Further, a NIST time source may be unavailable due to a break in communications with the NIST time server (e.g. heavy tree coverage), in which case the local time value is the best time value to which the device has access. Hence, depending upon various parameters, a decision is made as to what source provides the more accurate time value and that value is then loaded into memory 54, 57 and made available for any requesting processes A 58. The process is continual, with iterative calculations being done at least 50 times per minute 59. The time value saved in memory 56 is referred to as NIST corrected time with the NIST "certified" time being used within system 30 when the NIST certified time is available within acceptable parameters.

Figure 4:
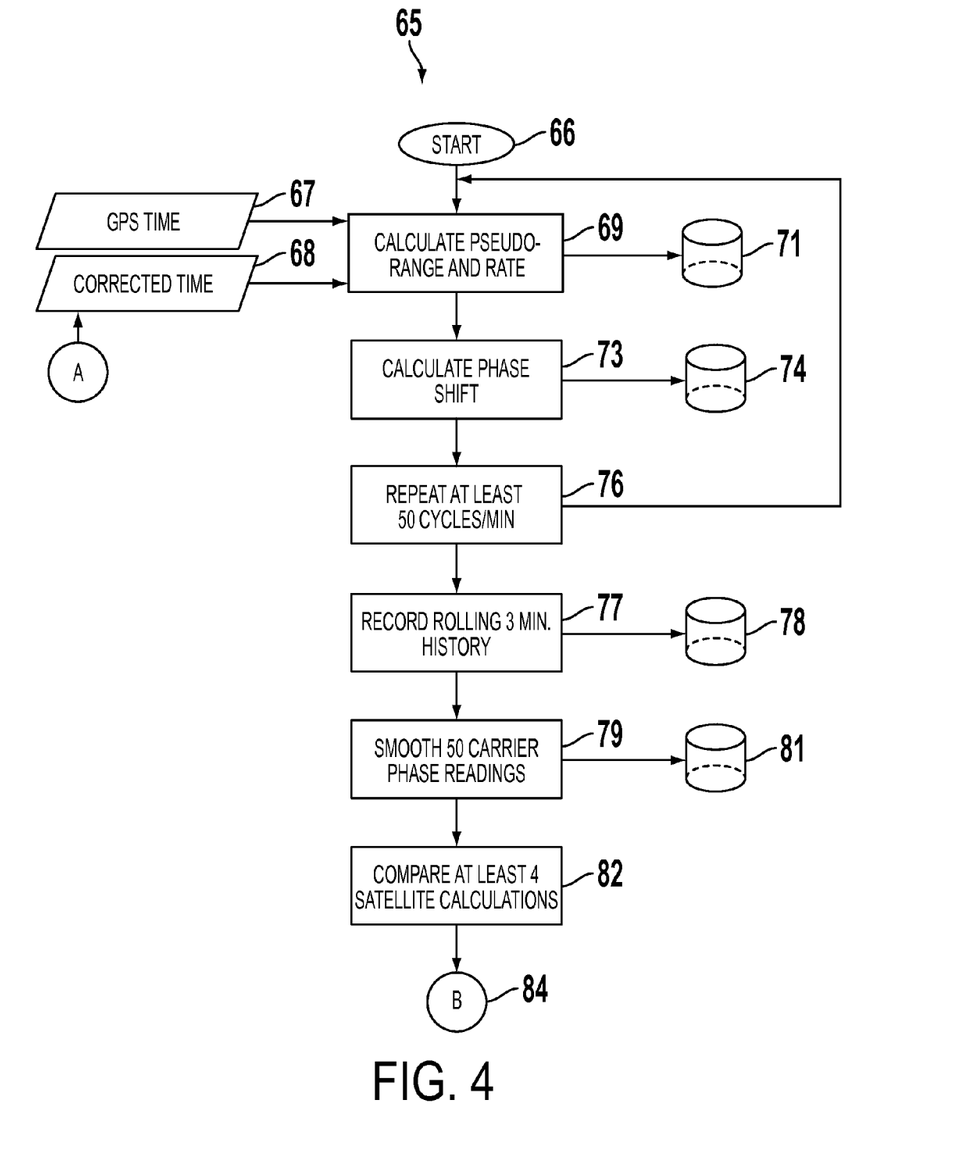
FIG. 4 is a functional block diagram of improving pseudo-range calculations.

Referring to FIG. 4, the use of NIST corrected time A 68 is input along with the GPS time received in the received GPS satellite messages 67 and two sets of pseudo-ranges calculated 69 and saved 71. The phase shift for each is then calculated 73 and saved 74. These steps are repeated at least 50 cycles per minute 76 and a rolling 3 minute history kept in memory 77-78. The smoothing of at least 50 carrier phase readings is made 79, saved into memory 81, and a comparison of a least 4 satellite calculations made 82.

Figure 5:
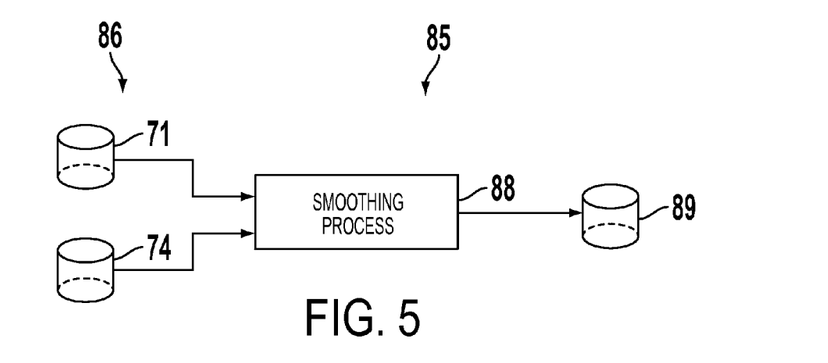
FIG. 5 is a functional block diagram of a smoothing process in the invention.

The recorded values of pseudo-ranges and rate 71, and phase shift 74 may be predictively smoothed to produce a predictive curve of those values with known predictive mathematics and then saved as a rolling data set and recorded 89, as shown by sub-process 85 in FIG. 5. This smoothing process 85 is used throughout sub-processes of invention 30 to assist in excluding values that reduce GPS precision. Such smoothing processing may utilize simple processes, such as averaging a known set of values, utilizing statistical means to produce a smoothing result, or other more complicated methods. Hence, for the purposes of the present system 30, use of the term "smoothing" shall have the equivalent means of a statistical averaging process, statistical mean process, or other similar statistical process.

Figure 6:
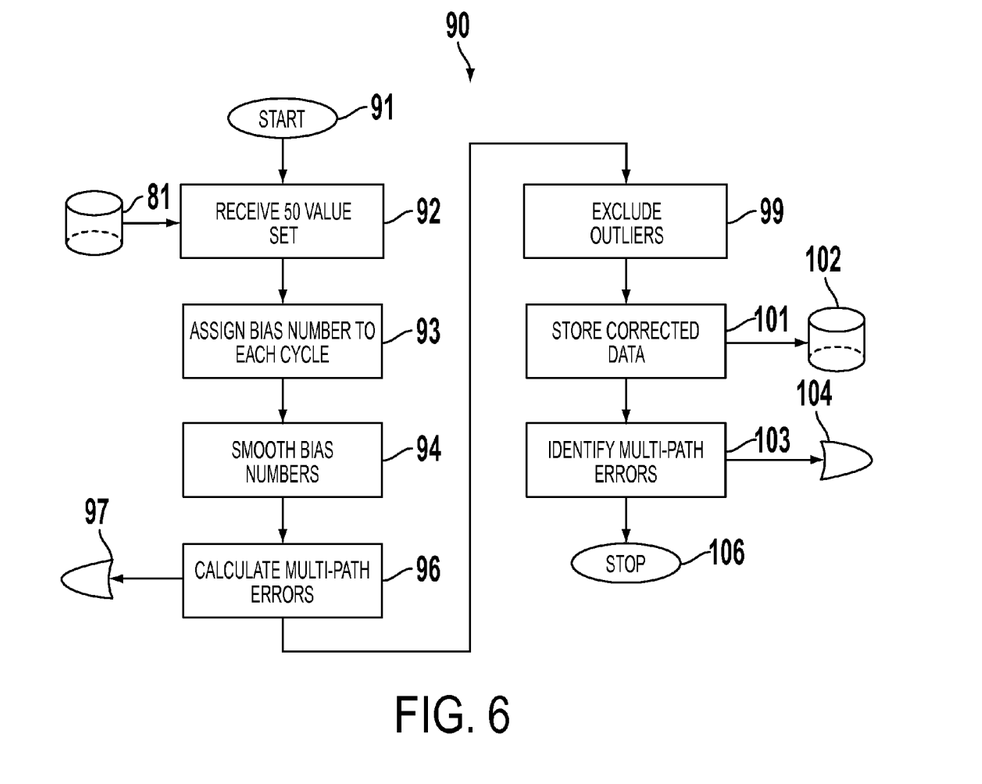
FIG. 6 is a functional block diagram of identification of multi-path errors process.

Referring to FIG. 6, carrier phase readings 81 are received 92 and a bias value assigned to each cycle of 50 readings 93. These bias values are then smoothed over a statistically valid sample set and multipath errors calculated 96 based upon a valid bias smoothing, which those multipath errors shown to the user 97 depending upon preselected criteria. The dataset is then analyzed and statistical outliers are excluded from the set 99 and the corrected data set stored 101 in memory 102. Outliers are identified as any reading that has a bias value greater than the smoothed bias value for the set. If a number of discovered outliers exceed a preselected value 103, an indication of multi-path errors being present is indicated to the user 104.

Figure 7:
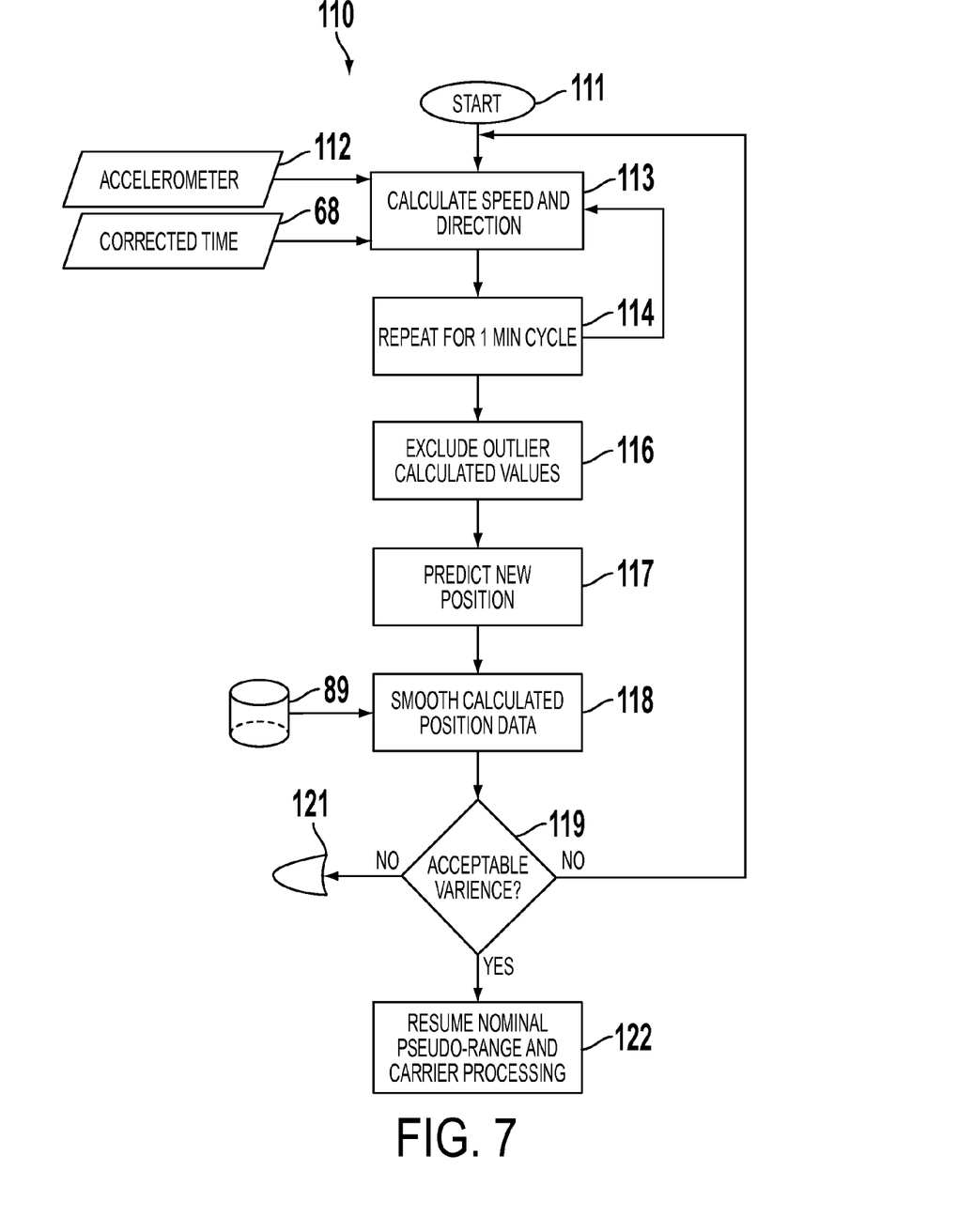
FIG. 7 is a functional block diagram of a predictive positioning process in the invention.

Process 110 indicates a predictive positioning technique when multi-path errors have exceeded a predetermined number such that GPS calculations would be less accurate than predictive positioning process. Accelerometer produces data 112 along with corrected time input 68 such that speed and direction may be calculated 113. The calculation is iterated for a 1 minute cycle 114 to produce a series of speed and direction data. The 1 minute data set is then processed and outlier values excluded 116 from the data set and recorded as a coherent data set. A new position is then calculated 117 and smoothed 118 in accordance with process 85 and saved in memory 89. If the smoothed values represent an acceptable variance 119, than pseudo-range and carrier phase processing resume pursuant to process 65. However, if the variance is not acceptable, a notification is sent to the user 121 and the process is repeated to attempt to obtain better predictive values.

Figure 8:
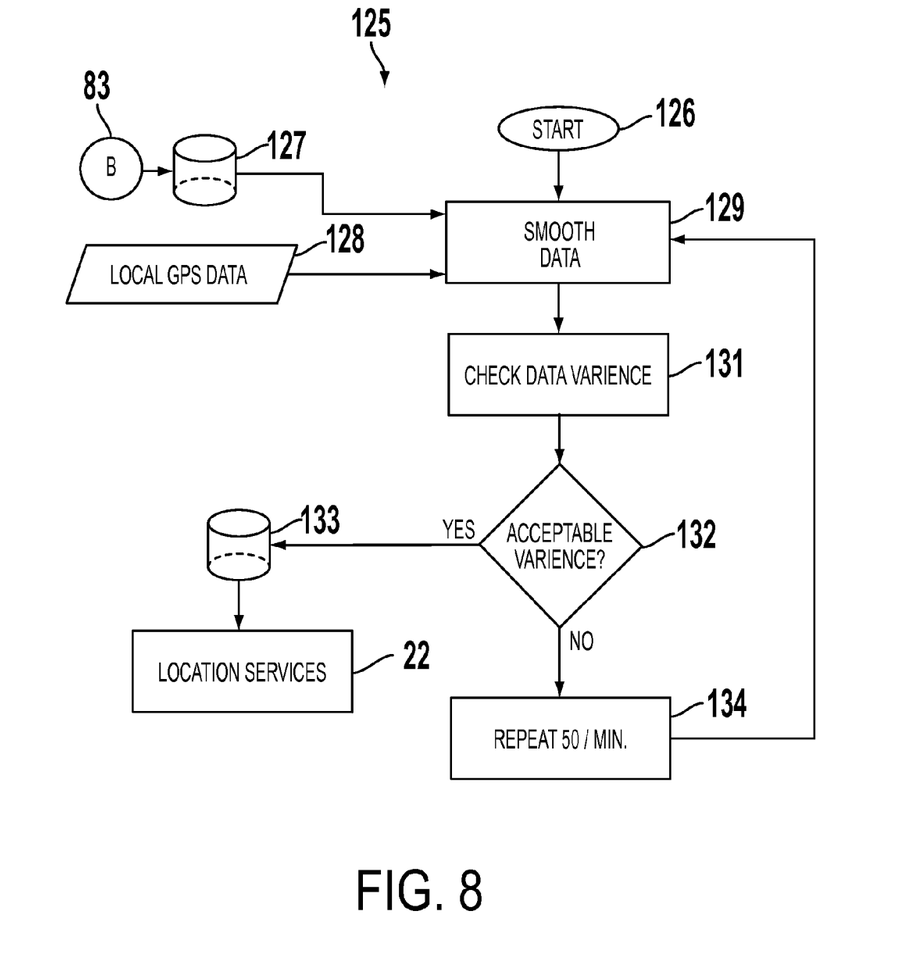
FIG. 8 is functional block diagram of variance data checking and correction in the invention; and, FIG. 9 is functional block diagram of a certification process of GPS data.

Pursuant to the process shown in FIG. 8, Data from process 65 B (83) and local GPS 128 are each smoothed pursuant to process 85. The smoothed data is then analyzed 131 and checked for acceptable variance 132. If the variance is acceptable, the data is saved 133 for access and consumption by location services 22. If the values are unacceptable, the process 125 is repeated at least 50 times per minute 134 until an acceptable variance data set is realized.

Figure 9:
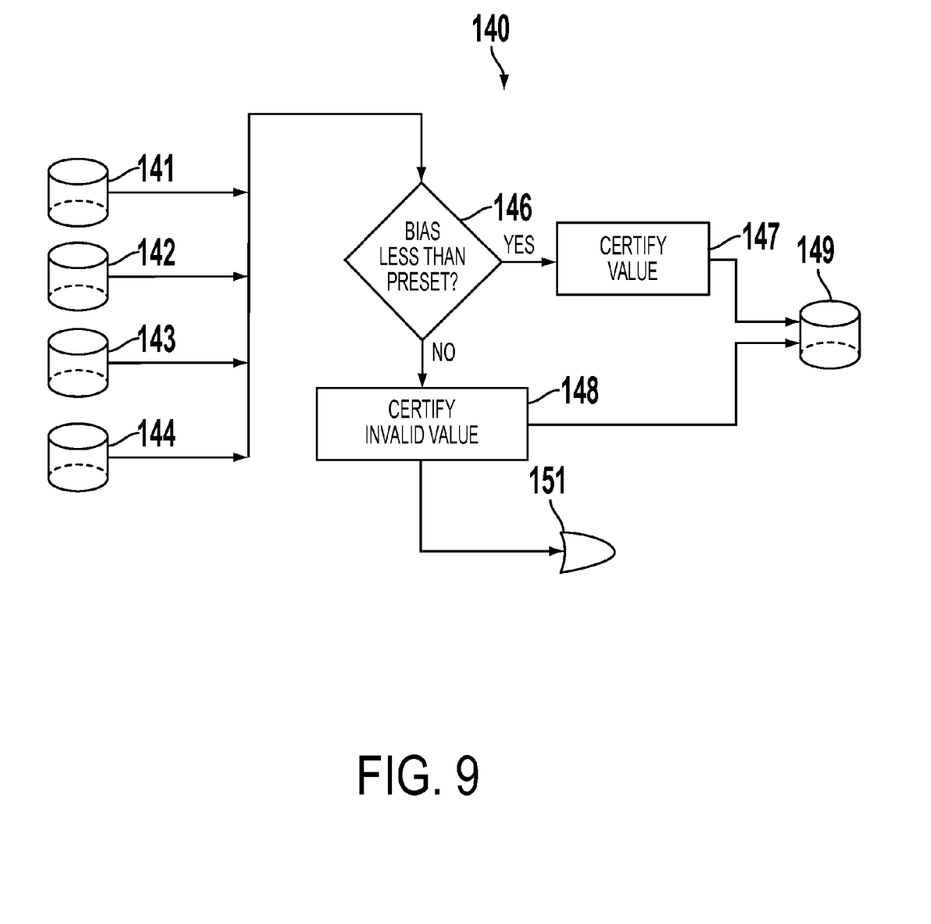

Referring now to FIG. 9, it may be seen that values resulting from processes in FIGS. 4-8 may be further classified as a "certified" or uncertified value in process 140. Any of the output values 141-144 are analyzed to determine if any prior values have a bias less than a bias preset 146. If the bias is less than the present, the value is classified as a certified value 147.

If not, the value is classified as an invalid value 148, and a notice is displayed to the user 151. Each value along with its assigned classification is saved in memory 149.

While I have shown my invention in one form, it will be obvious to those skilled in the art that it is not so limited but is susceptible of various changes and modifications without departing from the spirit thereof. For example, the herein described processes may be implemented as application code to be executed in high-speed memory of the GPS device processor, or the processes may be implemented in discrete semiconductor chips to attain superior speed response. The inventor also envisions a hybrid scenario in which part of the systems is implemented in hardware (e.g. semiconductor chips), part in firmware, and part in application code. In terms of functionality, the actual implementation is irrelevant, although performance will vary depending upon the mix.

Having set forth the nature of the invention, what is claimed is:

1. A method for improving GPS calculations in a GPS enabled device, comprising the steps of:
    a. introducing a shim to circumvent an existing programming interface between a pseudo-range equation processing module and a location services module in a GPS enabled device;
    b. obtaining a NIST certified time value and comparing that value to existing time values to be used by said pseudo-range equation processing module in making pseudo-range calculations;
    c. utilizing said NIST certified time value in pseudo-range equation processing when said NIST certified time value is more accurate than the existing time value being utilized thereby improving pseudo-range calculation results;
    d. transferring said improved pseudo-range calculation results to a location services module in said device; and,
    e. utilizing said shim to spoof a GPS enabled device operating system into utilizing said improved pseudo-range calculation results as if they were produced with original time values.

2. A method as recited in claim 1, further including the step of making outlier modifications to pseudo-range equation enhancement sub-processing.

3. A method as recited in claim 2, wherein said pseudo-range equation enhancement sub-processing comprises making differential corrections whereby reverse GPS calculations from a base station having a known GPS location in communication with said GPS enabled device are utilized to make outlier modifications to pseudo-range equation enhancement processing.

4. A method as recited in claim 2, wherein said pseudo-range equation enhancement sub-processing comprises carrier phase tracking to enhance satellite signal synchronization.

5. A method as recited in claim 2, wherein said pseudo-range equation enhancement sub-processing comprises receiver autonomous integrity monitoring.

6. A method as recited in claim 2, wherein said pseudo-range equation enhancement sub-processing comprises atmospheric correction.

7. A method as recited in claim 1, wherein said step of obtaining a NIST certified time value and comparing that value to existing time values to be used by said pseudo-range equation processing module in making pseudo-range calculations comprises the steps of
    a. loading local time held by said GPS enabled device into memory;
    b. accessing a NIST time source and loading that NIST time value into memory;
    c. comparing the local time value to the NIST time source;
    d. If said NIST time source is more accurate than said local time value then load it into time stamp memory location; and,
    e. If said NIST time source is less than or equal to said local time value, then save said local time value into time stamp memory repeat said comparison steps a-c at least 50 times.

8. A method as recited in claim 7, wherein said step of accessing a NIST time source comprises accessing a certified NIST time server.

9. A method as recited in claim 1, wherein said step of utilizing said NIST certified time value in pseudo-range equation processing when said NIST certified time value is more accurate than the existing time value being utilized comprises the steps of:
    a. utilizing said NIST certified time value to calculate the pseudo-range and rate;
    b. calculating a phase shift;
    c. repeating steps a-b at least 50 times per minute;
    d. recording a rolling 3 minute history of said step c;
    e. smoothing 50 carrier phase readings; and
    f. comparing said 50 smoothed carrier phase carrier phase readings to at least 4 satellite calculations.

10. A method as recited in claim 9, further including the steps of:
    a. smoothing data from received from local GPS messages and NIST certified time value in pseudo-range equation processing;
    b. calculating a variance on said smoothed data;
    c. determining whether said variance exceeds a preselected value;
    d. if said variance does not exceed said preselected value then transfer said smoothed data to said location services module; and,
    e. if said variance exceeds said preselected value then repeat steps a-c at least 50 times per minute.

11. A method as recited in claim 1, wherein said step of utilizing said NIST certified time value in pseudo-range equation processing when said NIST certified time value is more accurate than the existing time value being utilized comprises the steps of:
    a. receiving a 50 cycle GPS value data set;
    b. assigning a bias number to each received cycle;
    c. smoothing said bias number in step b;
    d. calculating multi-path errors for each 50 value data set;
    e. excluding any outliers found in said 50 value data set;
    f. storing in memory data remaining after said exclusion step e; and,
    g. identifying said multi-path errors and notifying a user.

12. A method for improving GPS calculations in a GPS enabled device, comprising the steps of:
    a. introducing a shim to circumvent an existing programming interface between a pseudo-range equation processing module and a location services module in a GPS enabled device;
    b. obtaining a NIST certified time value and comparing that value to existing time values to be used by pseudo-range equation enhancement sub-processing;
    c. utilizing said NIST certified time value in said pseudo-range equation enhancement sub-processing when said NIST certified time value is more accurate than the existing time value being utilized thereby improving said pseudo-range equation enhancement sub-processing;

d. utilizing results in said step of using NIST certified time values in said pseudo-range equation enhancement sub-processing in said pseudo-range equation processing module to improve pseudo-range equation accuracy;

e. transferring improved pseudo-range calculation results to a location services module in said device; and, f. utilizing said shim to spoof a GPS enable device operating system into utilizing said improved pseudo-range calculation results as if they were produced with original time values.

13. A method as recited in claim 12, wherein said pseudo-range equation enhancement sub-processing comprises processing sub-modules selected from the group consisting of differential corrections whereby reverse GPS calculations from a base station having a known GPS location are in communication with said GPS enabled device are utilized to make outlier modifications to pseudo-range equation enhancement processing, carrier phase tracking to enhance satellite signal synchronization, receiver autonomous integrity monitoring, DOP orbital error signal exclusion, and atmospheric correction of GPS messages.

14. A method as recited in claim 12, wherein said step of utilizing said NIST certified time value in pseudo-range equation processing when said NIST certified time value is more accurate than the existing time value being utilized comprises the steps of:
a. utilizing said NIST certified time value to calculate the pseudo-range and rate;
b. calculating a phase shift;
c. repeating steps a-b at least 50 times per minute;
d. recording a rolling 3 minute history of said step c;
e. smoothing 50 carrier phase readings; and
f. comparing said smoothed 50 phase carrier phase readings to at least 4 satellite calculations.

15. A method as recited in claim 12, further including the steps of:
a. smoothing data from received from local GPS messages and NIST certified time value in pseudo-range equation processing;
b. calculating a variance on said smoothed data;
c. determining whether said variance exceeds a preselected value;
d. if said variance does not exceed said preselected value then transfer said smoothed data to said location services module; and,
e. if said variance exceeds said preselected value then repeat steps a-c at least 50 times per minute.

16. A method as recited in claim 12, wherein said step of utilizing said NIST certified time value in pseudo-range equation processing when said NIST certified time value is more accurate than the existing time value being utilized comprises the steps of:
a. receiving a 50 cycle GPS value data set;
b. assigning a bias number to each received cycle;
c. smoothing said bias number in step b;
d. calculating multi-path errors for each 50 value data set;
e. excluding any outliers found in said 50 value data set;
f. storing in memory data remaining after said exclusion step e; and,
g. identifying said multi-path errors and notifying a user.

17. A system for improving GPS calculations in a GPS enabled device, comprising:
a. means for introducing a shim to circumvent an existing programming interface between a pseudo-range equation processing module and a location services module in a GPS enabled device;

b. means for obtaining a NIST certified time value and comparing that value to existing time values to be used by pseudo-range equation enhancement sub-processing;

c. means for utilizing said NIST certified time value in said pseudo-range equation enhancement sub-processing when said NIST certified time value is more accurate than the existing time value being utilized thereby improving said pseudo-range equation enhancement sub-processing;

d. means for utilizing results in said step of using NIST certified time values in said pseudo-range equation enhancement sub-processing in said pseudo-range equation processing module to improve pseudo-range equation accuracy;

e. means for transferring said improved pseudo-range calculation results to a location services module in said device; and, f. means for utilizing said shim to spoof the GPS enable device operating system into utilizing said improved pseudo-range calculation results as if they were produced with the original time values.

18. A system as recited in claim 17, wherein said pseudo-range equation enhancement sub-processing comprises means for processing sub-modules selected from the group consisting of means for differential corrections whereby reverse GPS calculations from a base station having a known GPS location are in communication with said GPS enabled device are utilized to make outlier modifications to pseudo-range equation enhancement processing, means for carrier phase tracking to enhance satellite signal synchronization, means for receiver autonomous integrity monitoring, and means for atmospheric correction of GPS messages.

19. A system as recited in claim 17, wherein said means for utilizing said NIST certified time value in pseudo-range equation processing when said NIST certified time value is more accurate than the existing time value being utilized comprises:
a. means for utilizing said NIST certified time value to calculate the pseudo-range and rate;
b. means for calculating a phase shift;
c. means for recording a rolling 3 minute data history from said means for utilizing said NIST certified time value to calculate the pseudo-range and rate;
d. means for smoothing 50 carrier phase readings; and
e. means for comparing said smoothing means results to at least 4 satellite calculations.

20. A system as recited in claim 17, further including:
a. means for smoothing data from received from local GPS messages and NIST certified time value in pseudo-range equation processing;
b. means for calculating a variance on said smoothed data;
c. means for determining whether said variance exceeds a preselected value;
d. means for determining if said variance does not exceed said preselected value and transferring said smoothed data to said location services module; and,
e. means for if said variance exceeds said preselected value then repeating processing in said smoothing means and said variance calculating means at least 50 times per minute.

21. A system as recited in claim 17, wherein said means for utilizing said NIST certified time value in pseudo-range equation processing when said NIST certified time value is more accurate than the existing time value being utilized comprises:

a. means for receiving a 50 cycle GPS value data set;
   i. means for assigning a bias number to said means for receiving a 50 cycle GPS value data set;
   ii. means for smoothing said bias numbers formed in said bias means;
   iii. means for calculating multi-path errors for each 50 value data set;
   iv. means for excluding any outliers found in said 50 value data set;
   v. means for storing in memory data remaining from said excluding means; and,
   vi. means for identifying said multi-path errors and notifying a user.

* * * * *